Figure 1:
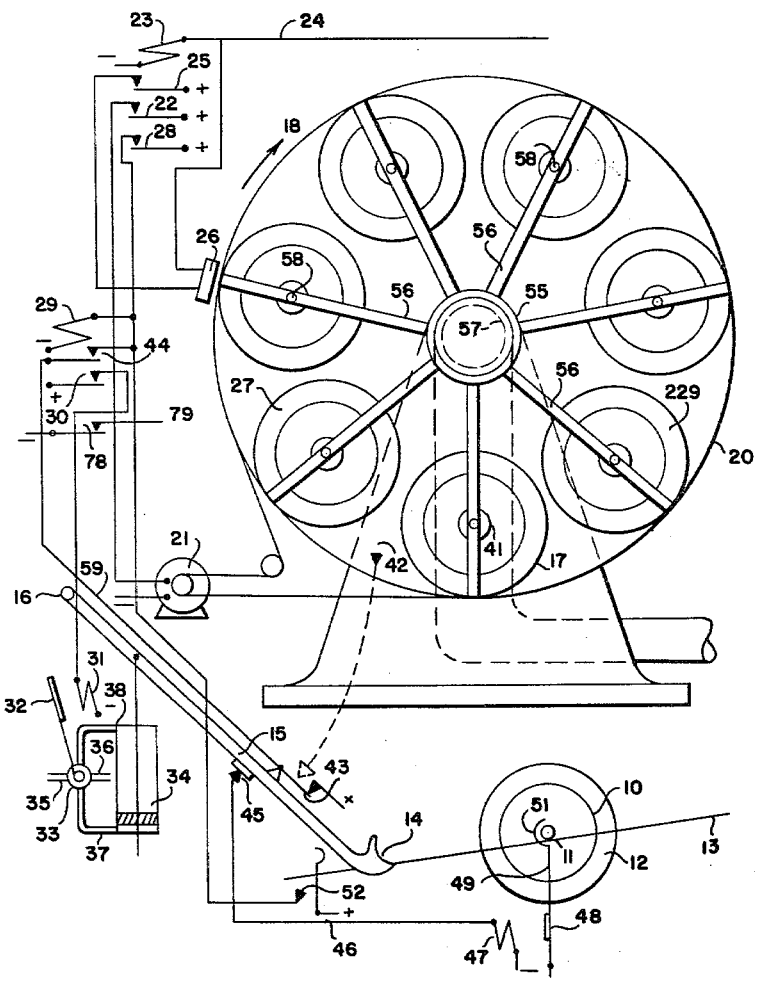

July 20, 1965  BO I. ANDERBERG ETAL  3,195,181
APPARATUS FOR CURING SLEEVE-FORMED PIPE-SHELLS
Filed Jan. 22, 1962  4 Sheets-Sheet 1

INVENTORS
BO I. ANDERBERG
SVEN H. CLAESSON

BY Larson and Taylor
ATTORNEYS

July 20, 1965 BO I. ANDERBERG ETAL 3,195,181
APPARATUS FOR CURING SLEEVE-FORMED PIPE-SHELLS
Filed Jan. 22, 1962 4 Sheets-Sheet 2

INVENTORS
BO I. ANDERBERG
SVEN H. CLAESSON

BY Larson and Taylor
ATTORNEYS

July 20, 1965  BO I. ANDERBERG ETAL  3,195,181
APPARATUS FOR CURING SLEEVE-FORMED PIPE-SHELLS
Filed Jan. 22, 1962  4 Sheets-Sheet 3

INVENTORS
BO I. ANDERBERG
SVEN H. CLAESSON

BY *Larson and Taylor*

ATTORNEYS

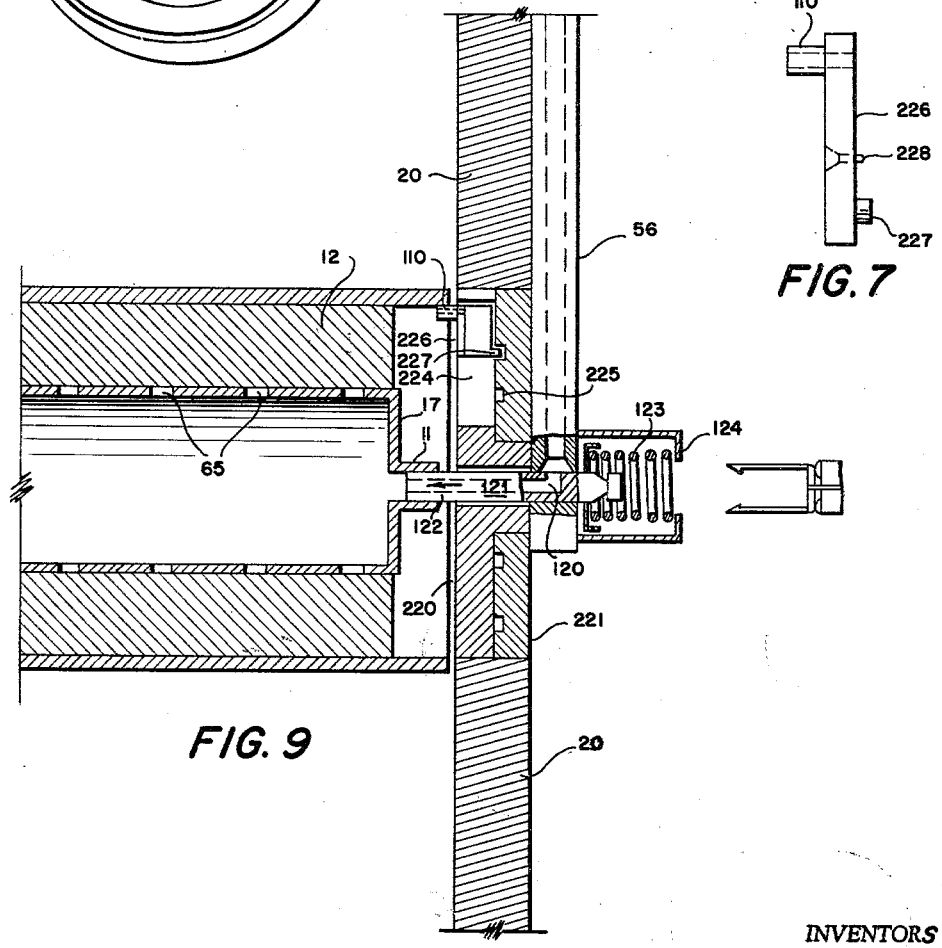

United States Patent Office 3,195,181
Patented July 20, 1965

3,195,181
APPARATUS FOR CURING SLEEVE-FORMED PIPE-SHELLS
Bo I. Anderberg and Sven H. Claesson, Skovde, Sweden, assignors to Rockwool Aktiebolaget, Skovde, Sweden, a corporation of Sweden
Filed Jan. 22, 1962, Ser. No. 167,872
Claims priority, application Sweden, Jan. 30, 1961, 918/61
5 Claims. (Cl. 18—6)

In the fabrication of insulating pipe covers or similar sleeve-like insulating members for insulation of piping, the insulation bodies eventually being divided up into sectors, one produces of an insulation material wound sleeves, commonly called pipe shells, in which the insulating material has in advance been impregnated with a curable material, such as a curing plastic, which is usually dissolved in a suitable solution, so that the pipe shell created at the winding can be brought into a heated curing chamber, where the solution is evaporated and the curing plastic or other binding material used can be cured so that the desired rigidity is achieved. The pipe shell may thereafter be subjected to other operations, such as grinding and cutting. The pipe shells may be used either as they are, or they may be divided into sectors for forming pipe-shell parts, which are intended to be joined together to surround and insulate the pipe.

The present invention relates to apparatus for heat-treatment of such wound sleeves or pipe shells, especially for curing plastic impregnated sleeves of mineral wool. The heat treatment apparatus generally comprises a step-wise rotating treating chamber, which receives the sleeves for heat treatment in a sector-formed distribution, said sleeves being placed on mandrels of perforated material. A conduit for the feed of the gases intended for the heat-treatment is connected to the rotational axis of the treatment chamber, and a distributor is arranged to conduct the gases from the rotational shaft through spokes to the interior of the sleeves, and thereafter out in the treatment chamber to exhaust. A net-work mat is provided during the heat-treatment to be pressed onto the heat-treated sleeve.

According to the instant invention the net-work mat is supported at at least one of its side edges, beyond the ends of the sleeve, by rollers which are situated in such a way that they limit the inward movement of the net-work mat and thereby fix the diameter of the sleeve after completed curing, and which are adjustable in radial direction, so that completed sleeves of different diameters may be fabricated.

Figure 2:
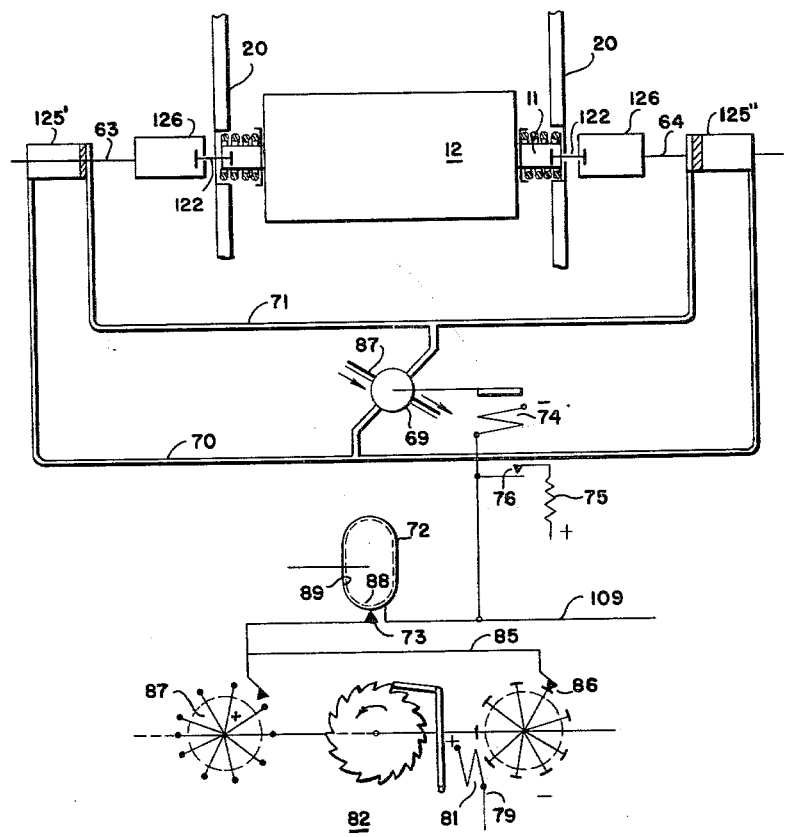
Figure 3:
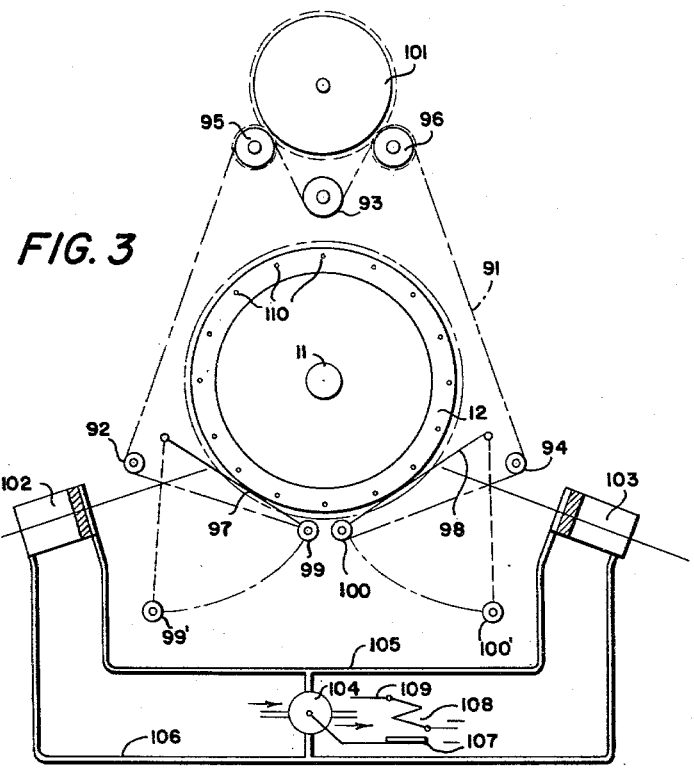

The invention will be further described below in connection with the drawings, in which: FIG. 1 shows a schematic view of a curing apparatus according to the invention for curing wound sleeves of mineral wool into pipe-shells, which are intended to be divided in radial direction. FIG. 2 shows schematically the general arrangement for rotation of each separate mineral-wool pipe-shell, and FIG. 3 shows substantially the same general arrangement in axial direction, as well as the arrangement of the net-work mat about one of the pipe shells. FIGS. 4–8 show in exploded views a portion of state one end-wall in the curing chamber with specific regard to the arrangement for supporting and adjusting the side edges of the net-work mat. FIG. 9 shows the arrangement for retaining a pipe-shell in its place inside the curing apparatus, and also shows schematically an exemplary arrangement for mounting the net-work mat supporting members in the turret walls.

It is not of vital importance for the present invention how the mineral wool sleeves have been produced. However, usually these sleeves have been formed by winding around a perforated mandrel made of sheet iron or similar material, which is closed at both its ends and carried by a hollow shaft. In FIG. 1, 10 indicates the mandrel, 11 the shaft and 12 is the mineral wool sleeve wound on the mandrel, which is to be subjected to heat-treatment, for instance, for curing the plastic. The plastic has been added to the mineral wool already in the form of a fluid solution of a heat-curing plastic, which sticks to the mineral wool.

On the conveyor path 13 the pipe shell 12 together with its mandrel 10 may be transported by the shaft 11 rolling on rails forming the conveyor path 13. Of course, the shaft 11 may also be carried forward by a catcher on a double transport chain. Thereby the pipe shell will later on be caught up by a feeder device to the curing device, by the shaft 11 gliding into a pair of claws 14 on an arm 15, which is turnable around a shaft 16. This arrangement has for its purpose to carry away a ready-cured pipe shell from the place in the curing apparatus, at which in FIG. 1 a pipe shell 17 is placed, and also to carry up the not yet cured pipe shell 12 into the same position in the curing apparatus, which pipe shell is in turn to be cured after having arrived by means of the conveyor device 13, whereafter the curing device should be turned one step. If, as shown in FIG. 1, there are arranged seven curing places inside the curing device, this should therefore turn one seventh of a turn. When, somewhat later, a new pipe shell has been fed on the path 13, the ready-cured pipe shell, which will after the turning of the curing device be in the lowermost position, should be removed, and thereafter the new pipe shell should be brought up into curing position.

The curing device consists mainly in two discs or wheels 20, mutually rigidly connected by means of a hollow shaft 55. The curing apparatus is normally surrounded by a cap for exhaust out of the gases or steams formed during the curing procedure, said cap however not being shown in the drawing. The curing device is intermittently driven in the direction of the arrow 18 by means of a belt 19, which is driven in turn by the motor 21. The motor 21 gets its current over a contact 22 on a relay 23, which will be attracted due to current over a conductor 24. The conductor 24 is arranged to be given a short pulse of current during the movement of the pipe shell 12 along the conveyor path 13, at the time that an exchange of pipe shell should take place in the lowermost position of the curing apparatus 20. The pulse of current over the conductor 24 thus causes a short magnetization of the relay winding 23, but in order that this relay shall remain attracted, it is so arranged that it will be self-binding over a contact 25 in series with a limit-position switch 26, which is controlled by the curing apparatus 20 during its rotation.

In the parts hitherto described this arrangement functions in the following way:

When a pulse of current passes through the conductor 24 the relay 23 is immediately attracted and closes its two contacts 22 and 25 as well as a third contact, the meaning of which will be evident from the following. By means of the contact 22 the motor 21 is started and the curing device 20 starts rotating. By means of the contact 25 the relay 23 will be self-binding in series with the limit-position switch 26. When the curing device 20 has rotated one step, which in the present case (seven curing places) is identical with one seventh of a turn, the limit-position switch is opened, and thereby also the self-binding circuit for the relay is opened, so that this relay is released, and the motor 21 stops. One curing station with a fully cured pipe shell 17 has then moved into the de-loading position, which is the lowermost position in the figure, and an earlier introduced, non-cured pipe shell 27 has been brought up in the first curing position. The pipe shell 17 which is fully cured should now be removed in order to make ready for the non-cured pipe shell 12, which is on its way onto the curing apparatus on the conveyor path 13.

The contact 28 on the relay 23 is provided for this purpose. By means of this contact an attraction circuit for an auxiliary relay 29 is closed, which immediately closes its contact 30 and thereby energizes the magnet 31, influencing its armature 32 and thereby turning a valve for the feed of pressure medium to a pneumatic servo-motor 34. The valve 33 is provided with a conduit 35 from a pressure medium reservoir, one conduit 36 to the surrounding atmosphere, one conduit 37 to the lower pressure chamber in the servo-motor 34 and one conduit 38 to the upper pressure chamber in the servo-motor 34. Normally the valve is under resilient pressure, so that it will tend to assume the position shown in the figure, in which there is communication between the pressure conduit 35 and the conduit 38 to the upper pressure chamber of the servo-motor and also between the lower pressure chamber of the servo-motor and the atmospheric conduit 36. Under the influence of the displacement of the armature 32, created as magnetization of the relay magnet 31, the valve 33 is turned in such a way that communication will instead exist between the pressure conduit 35 and the lower pressure chamber of the servo-motor 34 through the conduit 37 and between the upper chamber of the servo-motor 34 over the conduit 38 to the atmospheric conduit 36, respectively.

At the turning over of the valve 33 just described, the servo-motor 34 will be reversed. Its control arm is connected to above-mentioned arm 15, which will consequently be lifted up, turning in counter-clockwise direction. The arm 15 is provided with hooks or claws 14 for supporting the ready-cured pipe shell 17 together with the ends of its mandrel 41. It is unessential for the invention how the mandrel 41 is in other respects retained within the curing device. According to one suitable arrangement, the shaft of the mandrel is hollow, and bolts are provided to enter into this shaft. The hooks 14 may then be arranged in their upper position to close a switch, which, over a relay-device and a servo-motor, provides for these bolts on which the mandrel is hinged during its passage in the curing device to be drawn out so that the mandrel thereby will be free to be carried down by the arm 15 in its clock-wise direction movement. The arm 15 is therefore lifted up into such a position that the pipe shell 17 is made free from the carrier means in the curing apparatus and is instead carried up by the arm 15. In this position however a rigid recess 42 in the curing apparatus will contact a contact spring 43 on the arm with the consequence that the switch influenced by the contact spring 43 is opened. This contact is contained in series in a self-binding circuit for the relay 29 over the proper contacts 44 of this relay, and consequently the relay 29 will now be released. Immediately thereafter the magnet 31 is de-energized, the valve 33 reassumes due to resilient force its normal position, and pressure air from the conduit 35 is fed to the upper chamber in the servo-motor 34, so that the arm 15 is lowered and leaves the cured pipe shell 17 on the conveyor path 13.

Thereby the arm 15 closes a contact 45, which will give a pulse to a conductor 46. This pulse influences a magnet 47, the armature 48 of which is connected with an arm 49, which, at its end, carries up a hook 51. This hook has hitherto been in the way of the shaft 11 of the not yet cured pipe shell 12, together with its mandrel 10 approaching on the path 13, so that if this pipe shell should roll on too early, it will nevertheless not disturb the unloading of the preceding pipe shell 17. If a pipe shell 12 at the moment of magnetization of the magnet 47 rests on the hook 51, then it will now be made free for continuous movement onto the lifter arm 15 with its claw 14, and if no pipe shell should yet rest onto the hook 51 then the way for the next sleeve transported on the conveyor path 13 will be made free. If the conveyor path 13, as indicated above, consists of a double conveyor chain provided with catchers, the closing of current to the relay 47 will instead provide, that in a way known per se a pulse is given to this conveyor path for intermittent movement of the pipe shell resting thereon one step further. In this way sooner or later a new, non-cured mineral wool pipe shell will roll down or be conveyed to the claw 14 on the arm 15, and this will now be brought up into a position to be cured in the lowermost turned curing place, which is prepared therefor. For this purpose a switch 52 is arranged to be closed, when the new pipe shell 12 comes into position in the hook 14 of the arm 15. The switch 52 closes positive voltage to the winding of the relay 29, and this will now anew be magnetized, and be self-binding in the same way as before, and put the servo-motor 34 into function, so that the non-cured pipe shell 12 will be brought up into the empty curing place. The pipe shell will have to wait in this curing plate until a new pulse is created in the conductor 24, when, in the way already described, the curing device is turned one step, and a ready-cured pipe shell will again get into the position to be unloaded.

If, as mentioned above, two bolts are introduced into the hollow shaft in order to attack this shaft 11 from each side when the pipe shell 12 has moved into correct position, the pipe is retained in its place in the curing device by means of these bolts. A simple exemplary arrangement for this purpose is shown in FIG. 9.

FIG. 9 thus shows a part of the wheel 20 with one of its spokes 56. A mandrel 17 with a pipe shell 12 and the hollow shaft end 11 are shown in position. The shaft end 11 is retained by a hollow bolt 122, which has a hole 120 for the gases, which will later on during the procedure stream out through the spoke 56 in the direction of the arrow 121 and into the mandrel. The bolt 122 is retained in its position by a pressure spring 123, which is supported in a rigid support 124 attached to the spoke 56 or the wheel 20. When a mandrel is to be removed from the curing apparatus, the arm 15 is brought to move upwardly, so that its catcher device 14 will rest under the hollow shaft bolt 11. Through the pneumatic servo-motor 125 the device 126 is thereby brought forward onto the hollow bolt 122, whereby the catcher devices 127 will be exactly opposite to the indentations 128 in the bolt 122. The pneumatic servo-motor 129, which is arranged within the apparatus 126, will thereby close the catcher devices 127 together, so that they get into locking position in the indentations 128. By means of the servo-motor 125 all the arrangement 126 is thereafter brought back into its initial position, in the position shown in FIG. 9, and it will thereby carry with it the hollow bolt 122, whereby the mandrel 17 will rest on the catcher 14 on the arm 15 and follow this, when it moves downwards together with the arm 15 at the clock-wise movement of the said arm.

When a new, non-cured mineral wool pipe shell has been brought into the same position by the arm 15, an impulse is given to the servo-motor 129, which causes thereby, that the catcher device 127 will release the bolt 122 free, whereby this bolt will, influenced by the spring 123, enter into the hollow shaft ends 11 and retain the new mandrel together with its mineral wool pipe shell. FIG. 2 shows the control apparatus for the servo-motors 125 and 129 in a more complete but schematical diagram.

Before the curing apparatus has been turned into the next following step after a new pipe shell has been fed, a mat is closed around the pipe shell. This mat has the purpose to press the outer surface of the pipe shell inwardly, so that this will be as compact as possible and the diameter of the pipe shell will be such that it closely corresponds to the final desired diameter of the pipe shell. The same mat has also the purpose to provide concentricity between the interior and the outer circumference of the pipe shell. The just mentioned arrangements will be further described below in connection with FIGS. 2, 3 and 9.

The proper curing apparatus functions in the following way:

Through a conduit 53 hot gases, for instance smoke gases from an oil burner working with forced draught, are brought into the bearing standard 54 and from this standard into the hollow shaft 55, about which the curing device is turning. In the interior of this shaft 55 a rigid sleeve is arranged, in which there is provided a number of holes, corresponding to the six spokes 56 to all curing places, except the lowest one, in which the mandrel and pipe shell are in the unloading or loading position. The sleeve 57 is thus only provided with six openings, whereas the number of curing stations in the curing device 29 is seven. Through the said openings the hot gas is also conducted into the spokes 56 and through openings 58 it is conducted on to the interior of the mandrels. These are provided with a great number of small perforations 65, whereby the gas will enter into the mineral wool pipe shell and run through this in radial direction, thereby heating the plastic solution existing therein, so that the solution is evaporated and the plastic is cured. In this way the pipe shells are ready cured when they finally come into the unloading position.

In FIG. 2 there is shown in a strongly schematical and simplified form the arrangement of the center bolts, by means of which the pipe shell is, during all of its treatment in the curing device, kept centered, and which is shown in detail in FIG. 9. FIG. 2 is directed primarily to the control arrangement, and the details of the mandrel support arrangement are shown in simplified schematic form. In the end walls 20 of the curing device, shafts 63, 64 for the center bolts 122 are supported in such a way, that they can be displaced in their own longitudinal direction. For the displacement of these shafts 63, 64 servo-motors 67, 68 are arranged under common control from a valve 69, with which the servo-motors 125′ and 125″ are connected by means of conduits 70, 71.

It is reminded that a projection 42 was arranged in the interior of the curing device for influencing a contact spring 43, so that this should open its contact with the conductor 59, see FIG. 1, when a pipe shell moved into correct position within the curing apparatus. It is therefore obvious that in this moment the individual center bolts of each curing place should enter into the hollow shaft ends of the pipe shell mandrels for retaining the pipe shell during the continuous treatment of same in the curing apparatus. For this purpose, consequently, seven such arrangements as schematically shown in FIG. 2 and shown in detail in FIG. 9 are provided, one for each curing place in the curing device. For distribution of the pulses for movement to the correct pair of centre bolts, viz. to the pair which keeps the pipe shell in the lowermost position, a commutator 72 is provided rigidly on the shaft of the drum 20. This commutator is assumed in the present case just to have arrived into the position shown in drawings, in which the brush 73 is in contact with the lamen 88 on the commutator, which is connected with the control magnet 74 of the valve 69 of the pipe shell of mineral wool, in unloading and loading position. The magnet 74 is so arranged that it is retained in its magnetized position by means of a self-binding circuit, running over a protection resistor 75 and a magnetized relay closed contact 76 on the magnet 74.

The relay 29 mentioned in connection with FIG. 1 is provided with a magnetized-relay-closed contact 78, which, at the magnetization of the relay 29, closes negative voltage to a conductor 79. As seen from FIG. 2 this conductor runs to the driving magnet 81 of a step-feeder work 82, which drives a commutator 84, the laminae of which are connected to negative voltage. These laminae, however, are provided with lamina openings of the same width as the laminae, so that the conductor 85 is alternatively carrying negative voltage and alternative is free of voltage.

The arrangement now described functions in the following way:

When a ready-cured pipe shell 17 is to be received down from the curing apparatus, the arm 15 is lifted up in the way described above, a movement which is started by the relay 29 being attracted and taking self-binding. Simultaneously the contact 78 is closed, and negative voltage is fed through the conductor 79 to the working magnet 81 of the step-feeder work 82, which, however, at that time will only bring its hook into attack position in order to cause a displacement of one step of the step-feeder work 82 at the subsequent de-magnetization of the magnet 81. When the arm 15 has come into such a position that it can receive the ready-cured pipe shell 17, the projection 42 will contact the contact spring 43, and the self-binding circuit of the relay 29 will be opened. Thereby the relay 29 is released, and its contact 78 is also opened, so that the magnet 81 of the step-feeder work 82 is free of current, and the prepared step movement is now fulfilled. Thereby, through the commutator 84, negative voltage is closed over a lamen just in contact with the brush 86 over the conductor 85 and the commutator 72 to the earlier positive terminal of the relay 74, so that the self-binding of this relay is released. No short-circuit will occur, however, because the protection resistor 75 is connected into the conductor.

At the de-magnetization of the magnet 74 the valve 69 is quickly turned over, and pressure air is fed from the conduit 87 to the conduit 71, so that both the servo-motors 67 and 68 draw back the centre bolts from the shaft 11 of the treated pipe shell, and this is made free in order to follow the arm 15 downwardly at its return movement, and thereafter to be given off for continuous transport to the conveyor path 13.

Thereafter the arm will collect a new mineral wool pipe shell, viz. the pipe shell 12 just transported forwards, and thereby the switch 52 will be closed, so that the relay 29 is again magnetized and takes self-binding. Thereby the contact 78 is again closed and over the conductor 79 the working magnet 81 of the step-feeder work gets current. As earlier, thereby its step hook is transferred into a position of preparation for a renewed feeding forward of the commutator 84, but this feeding-forward will not take place until the projection 42 has again influenced the contact spring 43, and the self-binding circuit of the relay 29 is opened. This relay is then released, which causes two different functions. Firstly the circuit 79 is opened at the contact 78, so that the step feeder magnet 81 is demagnetized, and the step feeder work is moved one step on, and secondly the return movement of the arm 15 will be initiated. This time, however, the pipe shell 12 will not follow the arm 15 in its movement, because at the last movement of the step-feeder work a second commutator 87, controlled by the step feeder work, has for a short time closed positive voltage to the conductor 85, and due thereto the relay 74 has been attracted and taken self-binding over the earlier described contact 76 and the protection resistor 75. This self-binding is not later opened, as long as the pipe shell is under curing, until the pipe shell is fully cured and shall be removed from the curing device after having passed all of its seven curing places. As soon as the pipe shell has moved into the position, which is in FIG. 1 assumed by the pipe shell 27, as a matter of fact the brush 73 has lost its contact with the lamen 88, which is connected to the relay 74 belonging to this specific curing place, and instead moved into contact with a lamen 89, which belongs to another curing place, and being in connection with the relay belonging to this curing place, corresponding to the relay 74.

FIG. 3 shows the arrangement of the mat, which serves to keep the mineral wool sleeve in rotation under pressure during the procedure of curing and thereby to improve its concentricity. Thus there are seven such arrangements as shown in FIG. 3, one for each curing place in the apparatus according to FIG. 1. The mineral wool pipe shell here as earlier is indicated 12. Its shaft 11 in this position is spanned between the two centre bolts 122 so that the pipe shell 12 will be in an axially and radially centered position at a particular curing station.

For rotating the shell about its shaft 11 a net-work mat is provided to run over a number of fixed re-directing roller 92, 93 and 94, two fixed driver rollers 95 and 96 and two rollers 99 and 100 mounted osciliatably on arms 97 and 98, respectively. On the shafts of the rollers 95 and 96 cog wheels are provided, which cooperate with a cog wheel 101 rotating around the shaft 55 of the curing apparatus, so that the two cog wheels driving the rollers 95 and 96 rotate with a number of turns, which is many times higher than the number of turns of the curing apparatus, simultaneously driving the network mat 91. This meanwhile contacts the pipe shell 12 in a way which is evident from FIG. 3, and the pipe shell is thereby caused intermittently to turn so that its curing shall be more evenly distributed, and is also subjected to successive pressure from the network mat 91, so that it will be compressed to a suitable degree and obtain the intended diameter.

The two rollers 99 and 100 are, as already mentioned, arranged on osciliatable arms 97 and 98, respectively, so that they can be swung away to the positions 99' and 100' in order thereby to make the pipe shell 12 free from removal, and also to open access to the curing place for introduction of a new pipe shell.

The arms 97 and 98 are arranged to get their osciliatory movements by means of pneumatic servo-motors 102 and 103 which, like the earlier mentioned servo-motors, are controlled by means of a valve 104, with which they are connected by means of pipe conduits 105, 106. The valve 104 is arranged to be turned over by means of its armature 107 under influence of a magnet 108, which, in electrical respect is connected in parallel with the magnet 74, FIG. 2, over a conductor 109. The servo-motors 102 and 103, are preferably of a greater pressure medium volume than the servo-motors 67 and 68, so that the movement of the first ones will be a little delayed to the movement of the latter ones. Thereby one gains security that the pipe shell shall be fully supported by the centre bolts before the network mat is closed around the pipe shell. It should also be observed that the servo-motors 102 and 103 cause a given elastically resilient tension in the network mat 91, so that this shall not during its compression action on the pipe shell 12 be subjected to too strong influences.

The network mat 91 is provided at one or both sides with a continuous tape of a suitable bendable material, for instance a chain or an easily bendable metallic band, which is resistant against drawing forces or the like. This band, during action, will rest freely in the air as long as the network mat has not yet compressed the pipe shell to its desired diameter, but after this diameter has been achieved, it will rest on bolts 110, which are rotatably supported in the end walls of the curing device 20, as shown more clearly in FIG. 9. These bolts shuold suitably be freely turnable, so that the network mat can pass over them without any considerable resistance.

The provision of these bolts is evident from FIGS. 4, 5, 6, 7, 8 and 9. In each of the curing pockets there is on each side two disks or cross-walls 220, 221, of which the cross-wall 220 is turned onto the interior of the curing apparatus and the cross-walls 221 onto the outer side of the curing apparatus. The disk 220 carries the shaft 222 of the cross-walls, which is hollow, and which contains displaceably in it the bolt 122. The two cross-wall discs 220 and 221 are mutually turnable and the shaft 222 is fixed on the cross-wall 220 and turnably runs through the cross-wall 221. They can be fixed in a position relative to each other by means of screws 223.

Figures 4, 5:
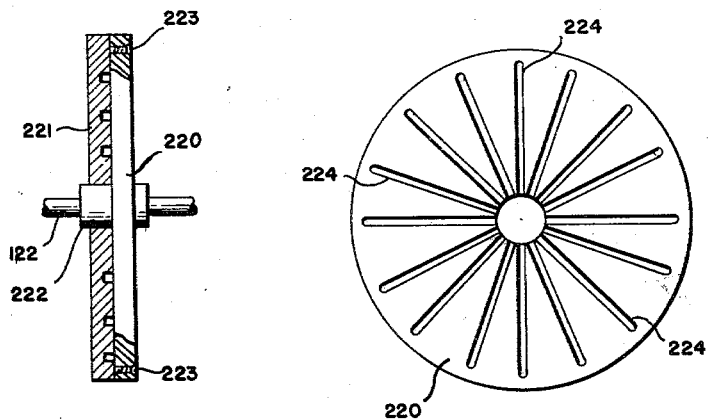

The cross-wall 220 is shown from the side in FIG. 5 and the cross wall 221 in FIG. 6. One will see that one of these cross-walls, in the present case the cross-wall disc 220, is provided with a number of radial grooves 224, whereas the other cross-wall 221 is provided with a spiral groove 225. In each specific position of the cross-walls, therefore, each radial groove 224 will in one or more places cross the spiral groove 225. To one of the different crossing points, thus created at each radial groove, a guidepiece 226, which is shown in a large scale in FIGS. 7 and 8, is connected by the guide piece on its back side being provided with a bolt 227, which enters into the spiral groove 225, whereas the guide piece proper is arranged to slide in the radial groove 224. The guide piece carries the pulley or rotatable bolt 110 and is further fixed to the cross-wall disc 221 by means of a screw 228.

In the form of execution shown in the drawing, one has arranged sixteen such guide pieces, each with its pulley 110. It is then obvious that the sixteen guide pieces should be provided with pulleys 110 at mutually somewhat different positions, in order that the pulleys should form a circular periphery, as seen from FIG. 3, although the bolts 227 enter into a spiral groove 225.

This arrangement has the purpose to make possible a quick and easy change of the dimension of the pipe shell, which is cured in the curing device. If one thus wants to adjust the curing apparatus for a different dimension of the mineral wool sleeve, one has only to screw free the fixture screws 223 between the two cross-wall plates and the fixture screws 228 between each of the guide pieces on the one side and the cross-wall plates on the other side, and thereafter to turn the two cross-wall plates 220 and 221 relative to each other. The guide pieces will then be displaced inwardly or outwardly, respectively, in the grooves 224 due to the attack between the bolt 227 and the spiral groove 225. When one has in this way obtained the correct diameter for the pulleys 110, the fixture screws are again locked, and all the arrangement is now adjusted for curing the pipe shell of the new dimension.

The above described arrangement for adjustment of the peripheral position of the bolts or pulleys 110 between the discs 220 and 221 is fully usable, but in practice it has proved to be somewhat complicated. However, it has been described in principle. In actual practice this arrangement would not be provided with fixture screws 223, so that one has manually to displace the two discs relative to each other. Rather there can be arranged on the one disc a hub in which rests a screw provided with a rack, said screw attacking a cog wheeled surface on the other disc, or some similar arrangement for simultaneous adjustment of all of the guiding pieces can be provided. The screw, of course, should be provided with some arrangement for locking itself.

It will be evident from the above that after a pipe shell has been introduced into the curing device in a position, which is assumed in FIG. 1 by the pipe shell 17, then all of the turnable part of the curing device will in steps turn in the direction of the arrow 18. The pipe shell 17 is therefore transferred in steps to one position after the other, until this pipe shell has, after a full turn, again arrived into the place of the pipe shell 17, whereafter it is removed to the conveyor 13 by means of the transport arm 15 in time with the feed of new, non-cured pipe shells. At each of the different curing stations the pipe shell is subjected to hot gas from the conduit 53, running through it, said hot gas being guided through the bearing foundation 54 to the interior of the shaft 55 and through the distributor 57 to the spokes 56, which carry the hot gas into the perforated mandrels 10 of the pipe shells. The hot gas thereafter enters through the material of the pipe shell first driving out the solution, which is evaporated or dried in, and thereafter curing the remaining plastic. For this purpose it is suitable that one arranges in the distributor 57 such openings for introduction of the hot gas that more gas is introduced as long as the mineral wool of the pipe shell is still cold, because the heat of the gas will to a great extent be consumed for heating the material of the pipe shell, but, on the other side, a smaller quantity of gas is introduced into the hot pipe shell in one or more of the latter steps, where the heat contents of the gas will only be used for the curing of the plastic.

The invention is not limited to the exact form which has been described above, but all kinds of different modifications may occur within the scope of the invention. Especially, as mentioned above, the invention is not limited to the use of seven curing stations or to the use of sixteen rollers for movably supporting the network mat, but one can choose each of these numbers in any suitable way. Nor is the invention limited to the use of pneumatic servo-motors for carrying out the different above described functions, but one can with equal advantage use other kinds of servo-motors. Many other details may also be modified within the scope of the invention. Thus one has achieved very good results with a device in which the network mat 91 did not consist in a continuous length, but of a mat of limited length, which was brought to describe to and fro movement.

What we claim is:

1. Apparatus for heat-curing binder impregnated fibrous pipe shells, comprising: a step-wise rotating treatment chamber defined by two spaced wall means, a hollow rotatable shaft connecting said two wall means, means for rotating said shaft and said wall means, a plurality of perforated hollow mandrels removably supported by and extending between said wall means, each of said mandrels having a pipe shell to be cured disposed about its outer surface, passage means for communicating the interior of said hollow shaft with the interior of each of said perforated mandrels, means for passing hot gases to the interior of said hollow shaft, distributor means for controlling the flow of gas from said hollow shaft to said perforated mandrels through said passage means, a network mat for bearing against the external surface of each of said pipe shells and extending at least partially around each of said pipe shells, means for translatably moving said mats to rotate said pipe shells and said mandrels during the curing process, a plurality of roller means carried by said wall means and engaging the outer edges of said mats for limiting the inward movements of said mats relative to said pipe shells to thereby fix the external diameters of said pipe shells, said plurality of roller means being arranged substantially in the form of a circle, means for adjusting said roller means radially relative to said mandrels so as to permit variations in the diameters of said pipe shells, and means for releasably supporting said mandrels in said wall means.

2. Apparatus as set forth in claim 1 wherein said rollers are carried by individual guide pieces, said guide pieces being confined between two abutting walls movable relative to each other, and means formed in the abutting surfaces of said abutting walls for moving said guide pieces radially when said abutting walls are moved relative to each other.

3. Apparatus as set forth in claim 2 wherein one of said abutting surfaces has a radial groove formed therein for each guide piece, said other abutting surface having a spiral-formed groove therein, at least a portion of each guide piece extending into a radial groove and the spiral-formed groove.

4. Apparatus for heat-curing binder impregnated fibrous pipe shells, comprising: two spaced wall means defining a treatment chamber therebetween; at least one perforated hollow mandrel extending longitudinally between said wall means and having a pipe shell to be cured formed about its outer surface; means for rotatably and releasably supporting said mandrel between said wall means; means for passing hot gases to the interior of said mandrel; a network mat for bearing against the external surface of the pipe shell at least partially about the periphery thereof; means for supporting and moving said mat relative to the axis of said mandrel so as to rotate said mandrel and said pipe shell about said axis during the curing process; a plurality of rollers carried by said wall means at each end of said pipe shell and having their axes of rotation disposed substantially parallel to the axis of rotation of said mandrel and pipe shell, said rollers being arranged in said wall means to form a figure substantially corresponding in form and dimensions to the desired cross-sectional form and dimensions of the finished pipe shell, said roller means engaging the respective end edges of said mat for limiting the inward movement of the mat toward the axis of said pipe shell to thereby fix the external diameter of said pipe shell, and means for adjusting said rollers radially relative to said pipe shell so as to permit variations in the diameters of finished pipe shells.

5. Apparatus as set forth in claim 4 wherein said network mat is an endless mat, and wherein said means for supporting and moving the mat comprises first roller means disposed parallel to the axis of said mandrel and opposite to one side thereof, second and third roller means disposed substantially adjacent and parallel to each other and adjacent to the outer periphery of said pipe shell on the opposite side thereof relative to said first roller means, said endless mat passing from said first roller means to and around said second roller means, and from said second roller means around the outer surface of said pipe shell to and around said third roller means, and back to said first roller means, means mounting said second and third roller means for movement toward and away from each other so as to provide an opening through which said mandrel and pipe shell can be inserted or removed, and means for driving one of said roller means so as to drive said network mat.

References Cited by the Examiner

UNITED STATES PATENTS

| | | | |
|---|---|---|---|
| 2,039,271 | 4/36 | Bierer | 18—6 |
| 2,110,076 | 3/38 | Bierer | 18—6 |
| 2,557,439 | 6/51 | Kmentt | 18—6 |
| 2,870,054 | 1/59 | Amos et al. | 18—26 XR |
| 2,962,787 | 12/60 | Gateau et al. | 18—26 XR |
| 2,979,765 | 4/61 | Stephens et al. | 18—6 XR |
| 2,997,739 | 8/61 | Smith et al. | 18—6 |
| 3,014,598 | 12/61 | Bergesen et al. | 25—40 |
| 3,039,140 | 6/62 | Andrews | 18—6 |
| 3,087,222 | 4/63 | Mousset | 18—26 XR |
| 3,114,173 | 12/63 | Boggs et al. | 18—26 |

MICHAEL V. BRINDISI, *Primary Examiner.*